United States Patent
Ruffa

(10) Patent No.: US 8,520,471 B1
(45) Date of Patent: Aug. 27, 2013

(54) TOWED ACOUSTIC SOURCE

(75) Inventor: Anthony A. Ruffa, Hope Valley, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 398 days.

(21) Appl. No.: 12/699,176

(22) Filed: Feb. 3, 2010

(51) Int. Cl.
*G01V 1/145* (2006.01)
*G10K 9/10* (2006.01)

(52) U.S. Cl.
USPC .................... 367/143; 367/142; 116/137 A

(58) Field of Classification Search
USPC ............ 181/113, 114, 118, 120; 367/143, 367/148, 142
See application file for complete search history.

(56) References Cited

U.S. PATENT DOCUMENTS

| | | | | |
|---|---|---|---|---|
| 2,977,705 A * | 4/1961 | Busnel | ............................ | 43/17.1 |
| 3,319,735 A * | 5/1967 | Hayes et al. | ................. | 181/142 |
| 3,536,157 A * | 10/1970 | Anstey | .......................... | 181/120 |
| 3,610,366 A * | 10/1971 | Goldberg | ...................... | 181/120 |
| 3,642,090 A * | 2/1972 | Bennett | ........................ | 181/121 |
| 3,684,050 A * | 8/1972 | Johnston | ...................... | 181/113 |
| 3,704,443 A * | 11/1972 | Rosenberg | ................... | 367/148 |
| 3,718,207 A * | 2/1973 | Babb | ............................ | 181/120 |
| 3,764,965 A * | 10/1973 | McLean et al. | ............... | 367/143 |
| 4,030,063 A * | 6/1977 | Wallen | ........................ | 367/143 |
| 4,087,780 A * | 5/1978 | Itria et al. | ........................ | 367/17 |
| 4,198,706 A * | 4/1980 | Elliott | .......................... | 367/148 |
| 4,271,925 A * | 6/1981 | Burg | ............................ | 181/120 |
| 4,970,704 A * | 11/1990 | Kelly | ............................ | 367/142 |
| 6,464,035 B1 * | 10/2002 | Chelminski | ................... | 181/120 |

* cited by examiner

*Primary Examiner* — Ian Lobo
(74) *Attorney, Agent, or Firm* — James M. Kasischke; Michael P. Stanley; Jean-Paul A. Nasser

(57) ABSTRACT

A forward and aft open-ended, towed underwater acoustic source having a hollow with a plurality of wires disposed in parallel across one or both of the end openings. In operation, water flows around the wires and proceeds through the hollow body, exiting the aft open end of the body. The tensioned wires are situated normal to the direction of flow in order to cause production of Strouhal vibration frequencies due to the vortex shedding action of the water flow behind the wires. The source transmits broadband acoustic energy without requiring heavy transducers.

14 Claims, 1 Drawing Sheet

TOWED ACOUSTIC SOURCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to a towed, acoustic noise generating source.

(2) Description of the Prior Art

It is well known in the towed acoustic noise source art that there are a number of off-the-shelf, towable, underwater acoustic noisemakers that provide an easy and inexpensive way to generate in-water noise signals having reasonable bandwidth and source level characteristics. For example, one such well-known device is an underwater siren that includes a multi-bladed rotor with a plurality of holes in each rotor blade. These holes generate sound as the blades are turned by the water flow. Such devices however typically have the disadvantage that the generated noise waveform characteristics are not very controllable. These devices also have the drawback that the specific waveforms that they generate cannot be easily changed. What is needed is a way to overcome the present inherent lack of control over the generated sound waveforms that are produced by the prior art devices while at the same time keeping the noise-generating source simple and lightweight.

SUMMARY OF THE INVENTION

Accordingly, it is a general purpose and object of the present invention to transmit broadband acoustic energy from a towed acoustic source.

It is a further object that the acoustic source generates carefully preselected Strouhal vibration frequencies in order to create the desired broadband, high energy, acoustic signals.

Another object is to have the acoustic noise source be tension prior to or during deployment in order to produce a plurality of different desired Strouhal frequencies from a single noise source.

These and other objects are accomplished with the present invention by providing a lightweight, forward and aft open-ended, towed underwater acoustic noise generating source apparatus having a tapered exterior body shape with a plurality of vertical, controllably tensioned metal or synthetic fiber (e.g., carbon fiber, fiberglass or para-aramid synthetic fiber such as Kevlar® or the like) wires disposed in parallel across the forward end opening. In operation, water flows around the wires and proceeds through the tapered body, exiting the aft open end of the body. It is important that the forward and aft end openings of the body have cross sectional areas that are sufficiently close in size to avoid Venturi effects. The tensioned wires are situated normal to the direction of flow in order to cause Strouhal vibration frequencies to be produced due to the vortex shedding action of the water flow behind the wires. The source transmits broadband acoustic energy generated by the vortex shedding, thus not requiring that heavy, expensive noise generating transducers need to be included as part of the tow body in order to produce the desired noise signature.

Other objects and advantages of the present invention will be apparent from the ensuing description.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
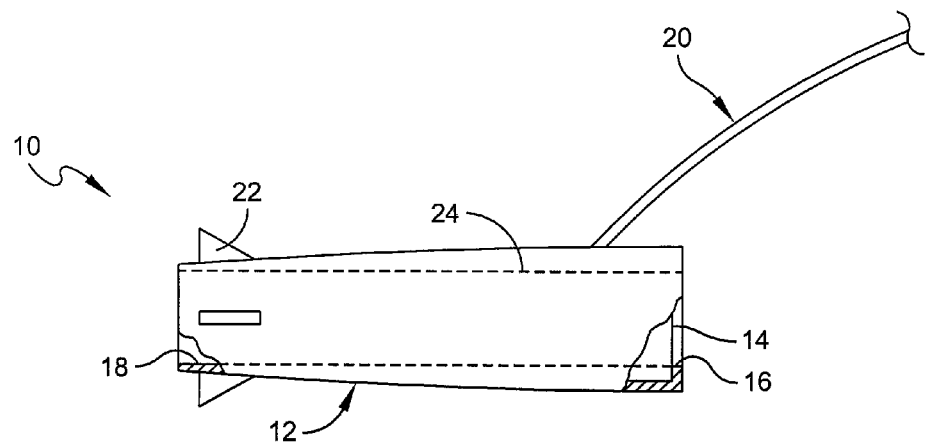
FIG. 1 shows a lightweight towed acoustic source apparatus built according to the teachings of the present invention.
Figure 2:
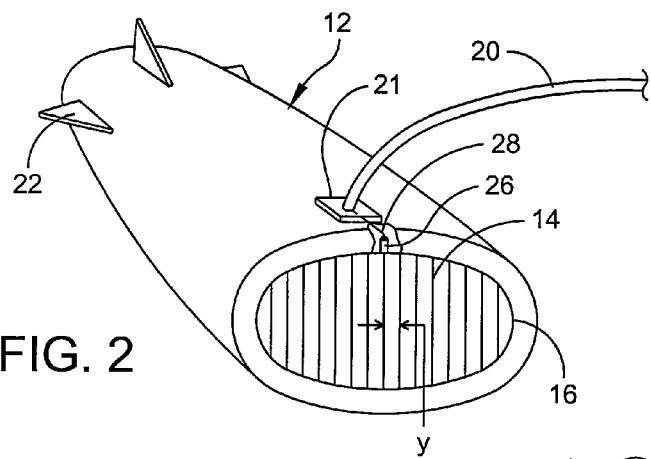
FIG. 2 shows an isometric view of the apparatus of FIG. 1 that displays an array of vertical tensioned wires disposed across the front end aperture of the source.

Referring now to FIGS. 1 and 2, there is shown one embodiment of the towed acoustic source 10, built according to the teachings of the present invention. Source 10 includes a tapered, open-ended tow body 12 having a plurality of tensioned metal (e.g., steel) or synthetic fiber (e.g., carbon fiber, fiberglass or para-aramid synthetic fiber such as Kevlar® or the like) wires 14 disposed vertically or horizontally across the forward end of body 12 and oriented normal to the direction of water flow when towed. While this shows wires 14 disposed across the forward end of body 12, it is understood that these wires could be disposed across either or both ends of body 14. Tow body 12 further includes a forward opening 16 and an aft opening 18, each opening selected to have a circular or oval shape, but both openings also having cross sectional areas that are sufficiently close in size to avoid venturi effects within body 12 while still permitting an increasing water flowrate through the successively tapering body 12 interior. For this purpose, forward opening 16 can be slightly larger than aft opening 18 or openings 16 and 18 can be substantially equal in size. Body 12's exterior surface taper produces better hydrodynamic characteristics.

A tow cable 20 is fixedly attached to the exterior surface of the top of the front end of body 12 at a mount 21. This provides the necessary tow force for the source 10 while also providing electrical power to source 10. A plurality of stabilizing fins 22, four are shown in the preferred embodiment, are attached to the aft end of tapered body 12 to permit a controlled tow to occur. While FIG. 1 shows the fins 22 in vertical and horizontal orientations, it is understood that other fin arrangements such as diagonal or Y-shaped are possible. Dashed alignment lines 24 of FIG. 1 demonstrate that openings 16 and 18 each have the same cross sectional area. It is noted that the length of tow body 12 has no measurable effect on the signal characteristics. FIG. 2 further shows a typical top end termination for one of wires 14 disposed inside tow body 12, where the wire 14 is attached to a solenoid 26 that is powered by a lead 28 from cable 20. While not shown in FIG. 2, it is understood that one each of a plurality of leads 28 and solenoids 26 are attached to the top end of a corresponding top of plurality of wires 14. Other embodiments may feature multiple wires 14 joined to a single solenoid 26, so that action of one solenoid 26 can reduce tension in the associated wires 14.

The tensioned wires 14 have preselected diameters, tensions and chosen material properties that together produce the intended velocity induced vibrations at the desired Strouhal frequencies. The Strouhal vibration frequency $f_s$ generated by each wire due to flow induced vortex shedding is generally defined as:

$$f_s = 0.2 \frac{U\sin\theta}{d} \quad (1)$$

where d is the wire diameter, $f_s$ is the Strouhal frequency, U is the tow speed, and $\Theta$ is the angle of the wires relative to the direction of water flow. For example, a synthetic fiber wire having a 1 mm diameter and being towed at 10 knots (–5 m/s) normal to the flow (i.e., $\Theta$=90° generates sound at a frequency of 1000 Hz. Note that the tow body has a variable tapering diameter, leading to a variable flow speed along its length. This diameter narrowing can also occur internally and has a direct affect on the Strouhal frequency of the signal produced, but the internal taper should not be sufficiently large to induce Venturi effects.

In order to maximize the total source level produced, each wire is tuned to its Strouhal frequency by adjusting its tension. This tuning changes the transverse wave speed c according to the relationship:

$$c = \sqrt{\frac{T}{m}}, \quad (2)$$

where T is the tension force and m is the mass per unit length including the added mass of the displaced water. Kevlar® and many other synthetic fibers have a specific gravity approaching that of water, so the mass per unit length for a 1 mm diameter fiber is $7.85\times10^{-4}$ kg/m. The added mass for a cylinder accelerating in a direction transverse to its axis equals the mass of fluid displaced by the cylinder. Thus, the total mass is the sum of the two, or $1.57\times10^{-3}$ kg/m. A 1-meter long wire is exactly one wavelength at a tension of 1,570 Newtons or 353 lb of force. Metal wires have more mass per unit length for the same diameter, and thus would achieve a full wavelength at a 1-meter length at lower frequencies. In the preferred embodiment, the tension is preset before deployment so that the resonant frequency of each wire matches the vortex shedding frequency.

Figure 3A:
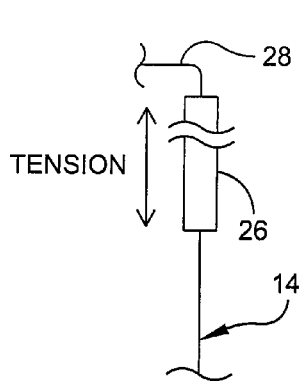
FIG. 3A shows a first wire-tensioning solenoid operated device for use with the apparatus of FIGS. 1 and 2.
Figure 3B:
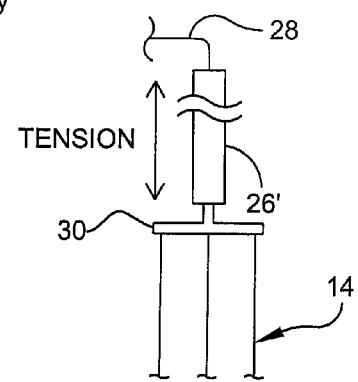
FIG. 3B shows a second wire-tensioning solenoid operated device for use with the apparatus of FIGS. 1 and 2.

A tensioning device is also desired that can quickly remove the tension on each wire. The preferred way to do this involves attaching one end of each wire 14 to a corresponding solenoid-based actuator 26, as shown in FIG. 3A, so that the wire can be quickly loosened and re-tightened. This allows the generated waveform to be started, stopped, or changed as needed by tightening or loosening the appropriate wires while under deployment. FIG. 3B shows an alternate embodiment of the tensioning device. In this embodiment, solenoid-based actuator 26' is joined to a draw-bar 30 joined to multiple wires 14. This embodiment uses fewer solenoids than that shown in FIG. 3A. Other tensioning devices can use electrical motors and winding drums to tension wires 14.

A broadband waveform can be created with a plurality of wires of identical material at different tensions, so that each resonates at a different frequency. A second method would involve wires of different materials, or of different diameters. In this case, each wire would achieve a full wavelength at 1-meter at different frequencies even at the same tension. This would occur because the mass per unit length of each wire would be different.

The number of wires at the forward opening of the tow body should be kept as high as possible in order to maximize source sound level. However, when adjacent wires are spaced too close to each other, an individual wire's vortex shedding pattern begins to interfere with that of the neighboring wires and is altered due to vortex interactions. But, this only occurs when the wire separation distance "y" in FIG. 2 is on the order of a few wire diameters d. Since the wire diameter is approximately one millimeter, a separation of several millimeters allows a high wire density, thereby maximizing the source sound level and bandwidth.

The primary advantages of the present invention are that because there is no need for sound producing transducers in the tow body, the body will be very light for easier deployment and recovery. The cost of using such transducers is also avoided. In addition, the ability to change or eliminate the wire tension gives greater control over the sound generated by apparatus 10.

What has thus been described is a lightweight, forward and aft open-ended, towed underwater acoustic noise generating source having a tapered exterior body shape with a plurality of vertical, controllably tensioned metal or synthetic fiber wires disposed in parallel across the forward end opening. In operation, water flows around the wires and proceeds through the tapered body, exiting the body's aft open end. It is important that the forward and aft end openings of the body have cross sectional areas that are sufficiently close in size to avoid adverse hydrodynamic affects. The tensioned wires are situated normal to the direction of flow in order to cause Strouhal vibration frequencies to be produced due to the vortex shedding action of the water flow behind the wires. The source transmits broadband acoustic energy generated by the vortex shedding, thus not requiring that heavy, expensive noise generating transducers have to be included as part of the tow body in order to produce the desired noise signature.

Many modifications and variations of the present invention may become apparent in light of the above teachings. For example: the wire material may be metal or may be a synthetic fiber having sufficient tensile strength for the Strouhal frequencies desired; the number, diameter and spacing of the wires can be varied according to the teaching of the invention to produce the desired signal strength; the tension of individual wires can be preset or changed while deployed to many desired levels; the fins can be varied in number and orientation without deviating from the teachings of the present invention; and also the forward and aft opening cross sectional shape can be varied as long as the cross sectional area remains substantially equal.

In light of the above, it is therefore understood that within the scope of the appended claims, the invention may be practiced otherwise than as specifically described.

What is claimed is:

1. A towed underwater acoustic source apparatus, comprising:
   a tow body having an exterior, a hollow interior, a forward end and an aft end wherein a front aperture is formed at said forward end and an aft aperture is formed at said aft end;
   a plurality of external fins, affixed to the exterior of said tow body proximate the aft end;
   a tow cable mount affixed to the exterior of said tow body;

a plurality of wires, each having a preselected tension applied and being disposed in at least one of said front aperture and said aft aperture of said tow body, said wires being capable of collectively emitting a preselected acoustic energy level when said apparatus is towed at a preselected velocity; and at least one tensioning device affixed between said tow body and at least one of said plurality of wires.

2. The apparatus of claim 1 wherein said at least one tensioning device is affixed between said tow body and all of said plurality of wires.

3. The apparatus of claim 1 wherein said at least one tensioning device comprises one tensioning solenoid associated with each of said plurality of wires.

4. The apparatus of claim 1 wherein said at least one tensioning device comprises one tensioning solenoid associated with at least two of said plurality of wires.

5. The apparatus of claim 1 wherein each said wire is a synthetic fiber.

6. The apparatus of claim 1 wherein each said wire is a metal material.

7. The apparatus of claim 1 wherein said wires are of different materials.

8. The apparatus of claim 1 wherein said tow body forward end is larger than said tow body aft end, said tow body exterior tapering from said forward end toward said aft end.

9. The apparatus of claim 8 wherein said tow body front aperture is slightly larger than said tow body aft aperture.

10. The apparatus of claim 1 wherein said tow body has a generally oval exterior cross sectional shape with the major axis of said oval aligned horizontally, said front and aft apertures also having oval cross sections.

11. The apparatus of claim 1 wherein said tow body has a generally circular exterior cross sectional shape, said front and aft apertures also having circular cross sections.

12. The apparatus of claim 1 wherein said tow cable mount is affixed to the exterior of the top of the forward end of said tow body.

13. The apparatus of claim 1 wherein said external fins are orthogonally disposed with a vertical and horizontal orientation.

14. The apparatus of claim 1 wherein said external fins are orthogonally disposed with diagonal orientations.

* * * * *